(12) United States Patent
Olvera et al.

(10) Patent No.: US 6,305,065 B1
(45) Date of Patent: Oct. 23, 2001

(54) METHOD OF ASSEMBLING ROOF DECKING TO AN UNDERLYING SUBSTRATE

(75) Inventors: Gilbert Olvera, Chicago; George M. Velan, Mt. Prospect, both of IL (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/499,521

(22) Filed: Feb. 10, 2000

Related U.S. Application Data

(62) Division of application No. 09/363,021, filed on Jul. 29, 1999, now Pat. No. 6,203,442, which is a division of application No. 08/994,521, filed on Dec. 19, 1997, now Pat. No. 6,171,042.

(51) Int. Cl.$^7$ .................................................. B23P 11/00
(52) U.S. Cl. ................................. 29/432; 411/441
(58) Field of Search .................. 52/22, 14, 520, 52/543, 508, 512; 411/441, 440, 525, 526, 533, 439; 29/525.01, 525.13, 525.03, 432, 716, 798; 72/88, 108; 470/8, 9, 11, 27, 32, 34, 38, 40

(56) References Cited

U.S. PATENT DOCUMENTS

| Re. 26,518 | 1/1969 | Mau et al. . |
|---|---|---|
| 328,951 | 10/1885 | Lewis . |
| 368,688 | 8/1887 | Rogers . |
| 387,184 | 7/1888 | Rogers . |
| 1,273,441 | 7/1918 | Bardwell . |
| 1,547,162 | 7/1925 | Bohlman . |
| 1,913,143 | 6/1933 | Robertson . |
| 2,165,007 | 7/1939 | Rosenberg . |
| 2,291,751 | 8/1942 | Oestereicher . |
| 3,019,677 | 2/1962 | Cermatori . |
| 3,137,195 | 6/1964 | Rosenberg, Jr. . |
| 3,154,075 | 10/1964 | Chase . |
| 3,196,654 | 7/1965 | Gordon . |
| 3,320,711 | * 5/1967 | Johnson .................... 52/14 |
| 3,324,542 | 6/1967 | Hilti . |
| 3,405,547 | 10/1968 | Orlomoski . |
| 3,478,638 | 11/1969 | Thurner . |
| 3,538,739 | 11/1970 | Orlomoski . |
| 3,555,957 | 1/1971 | Hermle . |
| 3,663,977 | 5/1972 | Marcovitch . |

(List continued on next page.)

FOREIGN PATENT DOCUMENTS

| 1074519 | 1/1960 | (DE) . |
|---|---|---|
| 1181139 | 11/1964 | (DE) . |
| 1081475 | 6/1954 | (FR) . |
| 1345502 | 10/1963 | (FR) . |
| 1378357 | 10/1964 | (FR) . |
| 2374143 | 7/1978 | (FR) . |

*Primary Examiner*—P. W. Echols
*Assistant Examiner*—Marc Jimenez
(74) *Attorney, Agent, or Firm*—Schwartz & Weinrieb

(57) ABSTRACT

A method of assembling roof decking to an underlying substrate comprises the steps of providing a pin having a shank portion and a head portion having a predetermined diametrical extent, and a washer, having a central aperture, disposed upon the shank portion of the pin such that the washer has a diametrical extent which is substantially the same as that of the pin head so as to cooperate therewith in guiding the pin when the pin is axially driven through a drive bore of a fastener-driving tool. The inner periphery of the washer central aperture is also provided with a plurality of concave pin-engaging surfaces which are angularly spaced from each other so as to encompass less than one-half of a complete cylinder, but not less than one-third of a complete cylinder, so as to limit potential damage to the shank portion of the pin when the washer is moved axially along the shank portion of the pin as the pin is driven into the substrate by the fastener-driving tool in order to secure the roof decking to the underlying substrate.

14 Claims, 2 Drawing Sheets

U.S. PATENT DOCUMENTS

| | | |
|---|---|---|
| 3,789,643 | 2/1974 | Dickson . |
| 3,828,604 | 8/1974 | Shelton . |
| 3,858,478 | 1/1975 | Boudreau, Jr. . |
| 3,921,495 | 11/1975 | Braun et al. . |
| 4,621,963 * | 11/1986 | Reinwall ............................ 52/520 |
| 4,691,491 * | 9/1987 | Lilley ................................. 52/481 |
| 4,802,802 | 2/1989 | Thurner . |
| 4,824,003 | 4/1989 | Almeras et al. . |
| 4,881,395 | 11/1989 | Shinjo . |
| 4,915,561 | 4/1990 | Buhri et al. . |
| 4,936,071 * | 6/1990 | Karrfalt ............................... 52/520 |
| 4,948,312 | 8/1990 | Jochum . |
| 4,986,709 | 1/1991 | Hachtel et al. . |
| 5,031,305 | 7/1991 | Furrer et al. . |
| 5,038,529 * | 8/1991 | Conley et al. ...................... 52/14 |
| 5,054,983 | 10/1991 | Froewis et al. . |
| 5,261,770 | 11/1993 | Hoepker et al. . |
| 5,286,153 | 2/1994 | Sartor et al. . |
| 5,292,216 | 3/1994 | Van Allman . |
| 5,664,922 | 9/1997 | Janssen et al. . |
| 5,730,570 | 3/1998 | Buhofer et al. . |

* cited by examiner

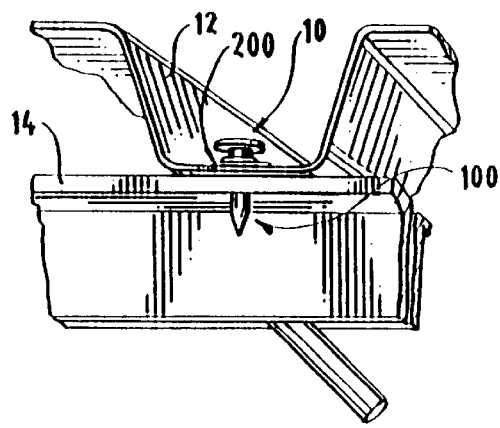
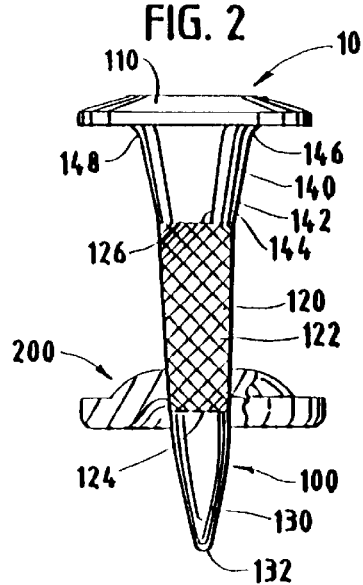
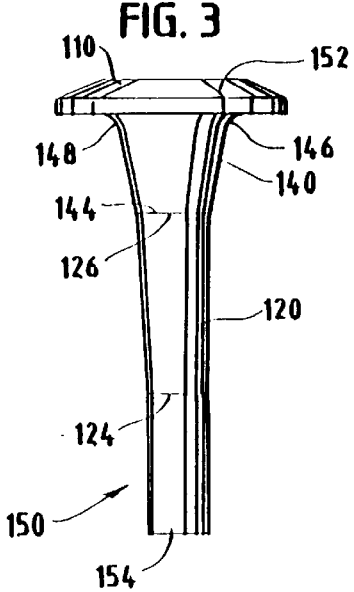
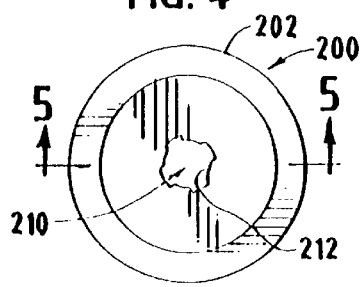
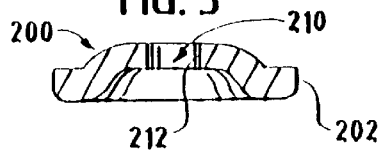
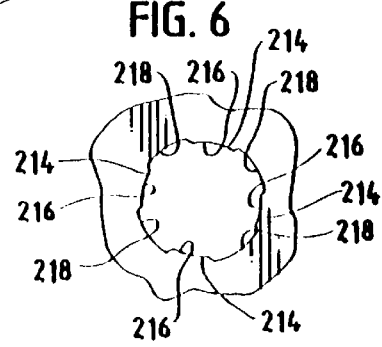

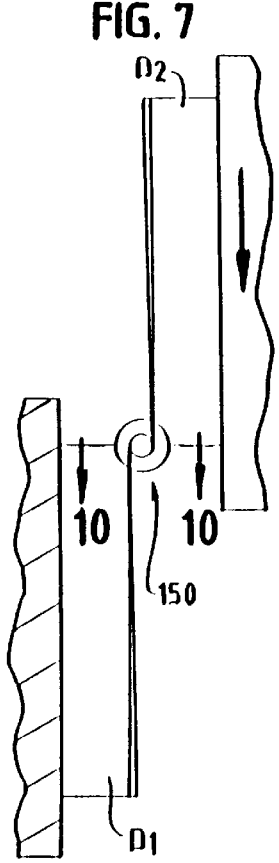
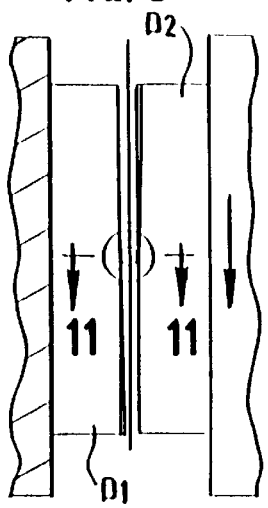
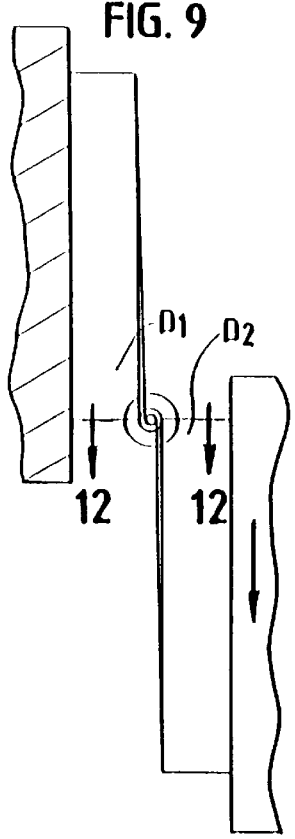
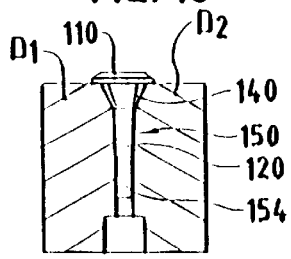
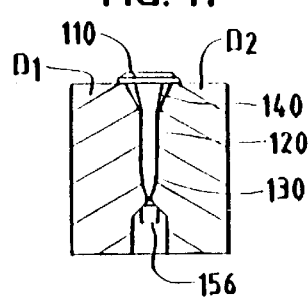
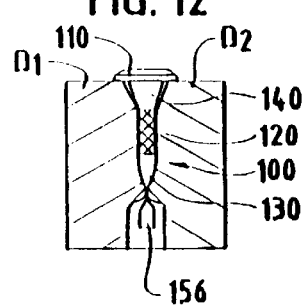

METHOD OF ASSEMBLING ROOF DECKING TO AN UNDERLYING SUBSTRATE

This patent application is a Divisional patent application of prior U.S. patent application Ser. No. 09/363,021, U.S. Pat. No. 6,203,442 which was filed on Jul. 29, 1999, which, in turn, is a divisional patent application of Ser. No. 08/994,521, U.S. Pat. No. 6,171,042 filed on Dec. 19. 1997.

TECHNICAL FIELD OF THE INVENTION

This invention pertains to a steel pin for axial, non-rotational penetration into a steel, concrete, or masonry substrate, to a fastener comprising such a pin and a steel washer, and to a steel washer useful in the fastener. This invention also pertains to a method of making such a pin.

BACKGROUND OF THE INVENTION

As exemplified in Almeras et al. U.S. Pat. No. 4,824,003, which issued to Societe de Prospection et d'Inventions Techniques S.P.I.T. of Paris, France, it is known to provide a steel pin, having a head, a shank, and a point, with a steel washer, having an outer diameter equal approximately to the outer diameter of the head, for guiding the steel pin in the muzzle, barrel, or nosepiece of a driving or setting tool. The steel washer is carried on the shank, in axially spaced relation to the head, and is movable toward the head when the pin with the washer is forcibly driven into a substrate, either directly or through a workpiece, so that the washer bears against the substrate or the workpiece. As exemplified therein, the steel washer also performs an energy-absorbing function.

As exemplified by a steel pin made and sold by Societe de Prospection et d'Inventions Techniques S.P.I.T., supra, under Product Designation SBR 14, it is known for the steel pin to have a head, an ogival point, a knurled shank, which is not tapered, and a transition zone having a tapered portion between the knurled shank and the head. The SBR 14 pin is made from carbon steel having a carbon content in a range from 0.58 percent to 0.62 percent.

As known heretofore, the steel pin can be made from a predetermined length of carbon steel wire, which has a carbon content not less than 0.35 percent and which can be surface hardened or through hardened. AISI C 1038 steel, which has a carbon content in a range from 0.35 percent to 0.41 percent, can thus be used. Moreover, the predetermined length of carbon steel wire is formed in an initial step so as to form an intermediate part, which has a head to become the head of the steel pin, a shank to become the shank of the steel pin, and an end portion, on which the point is formed in a further step. As known heretofore, the point is formed by rotary swaging or by so-called "pinch pointing", which refers to forging between two forging dies.

SUMMARY OF THE INVENTION

This invention provides improvements in a steel pin for axial, non-rotational penetration into a steel, concrete, or masonry substrate, in a steel washer useful with the steel pin, in a fastener comprising the steel pin and the steel washer, and in a method of making the steel pin. The fastener is designed to be forcibly driven so that the steel pin is driven into a steel, concrete, or masonry substrate, either directly or through a workpiece.

As improved by this invention, the steel pin is made from a predetermined length of carbon steel wire having an initial diameter and having a carbon content in a range from about the carbon content of AISI C 1038 steel to about the carbon content of AISI C 1065 steel. AISI C 1062 steel wire is preferred for the predetermined length of carbon steel wire. Broadly, the steel pin comprises a head, a tapered shank, a point, and a transition zone.

The head of the steel pin has an outer diameter at least about 2.6 times greater than the initial diameter of the predetermined length of carbon steel wire. Thus, the steel pin differs materially from the prior pin sold under Product Designation SBR 14, in which the head had an outer diameter about 2.3 times the initial diameter of the predetermined length of carbon steel wire used to make the prior pin sold thereunder. Heretofore, it was thought that the maximum diameter of the head of a pin in this carbon range was about 2.3 times the initial diameter, because the pins would be inconsistent due to non-round heads or to cracks caused by over work-hardening.

The tapered shank of the steel pin defines a comparatively smaller conical angle and has a smaller end and a larger end. Its smaller end has a diameter smaller than the initial diameter of the predetermined length of carbon steel wire, preferably being about 0.6 times the initial diameter thereof. Preferably, the larger end of the tapered shank has a diameter about 0.7 times the initial diameter of the predetermined length of carbon steel wire. The tapered shank pin is especially useful in attaching to a bar joist because it develops sufficient holding power by continuously sizing the hole that it forms in the bar joist.

Being joined unitarily to the smaller end of the tapered shank, the point conforms substantially to an ogive, preferably to a tangent ogive, which is tangent to the tapered shank. Although the point conforms substantially to an ogive, the point may have a rounded tip.

The transition zone has a tapered portion defining a comparatively larger conical angle between the tapered shank and the head. The tapered portion of the transition zone has a smaller end joined unitarily to the larger end of the tapered shank. The tapered portion thereof has a larger end joined unitarily to the head.

Preferably, the larger end of the tapered portion of the transition zone has a diameter about 1.1 times the initial diameter of the predetermined length of carbon steel wire. Preferably, the tapered shank defines a conical angle (total taper) in a range from about 2° to about 4°, and the axial length of the transition zone is less than about one half of the axial length of the tapered shank.

As improved by this invention, the steel washer is annular and has an annular periphery and a central aperture, which has a margin with a novel configuration. The margin of the central aperture defines plural projections with pin-engaging surfaces spaced angularly from one another. Each pin-engaging surface conforms essentially to a cylindrical section. Collectively, the pin-engaging surfaces encompass a minor portion of a complete cylinder, not less than about one third of a complete cylinder.

Preferably, the margin of the central aperture of the washer defines exactly four of the pin-engaging surfaces, which are spaced regularly from one another. Preferably, moreover, each pin-engaging surface is configured so as to encompass about one twelfth of a complete cylinder.

The steel washer improved by this invention can be advantageously combined with a steel pin, such as the steel pin improved by this invention, to provide an improved fastener. In the improved fastener, the annular periphery of the washer has an outer diameter equal approximately to the outer diameter of the head and wherein the central aperture of the washer enables the washer to be tightly fitted over the tapered shank, near the smaller end of the tapered shank, when the pin and the washer are assembled. Thus, when the fastener is forcibly driven so that the pin is driven into a steel, concrete, or masonry substrate, the washer and the head are arranged to guide the fastener through the muzzle, barrel, or nosepiece of the driving or setting tool and the washer is arranged to be forcibly moved along the tapered shank, toward the larger end of the tapered shank, as the pin enters the substrate.

As improved by this invention, the method of making a steel pin for axial, non-rotational penetration of a steel, concrete, or masonry substrate, such as the steel pin improved by this invention, contemplates making the steel pin from a predetermined length of carbon steel wire with an initial diameter and with a carbon content in a range from about the carbon content of AISI C 1038 steel to about the carbon content of AISI C 1065 steel, preferably from a predetermined length of AISI C 1062 steel wire, by successive forming, rolling, and heat treating steps.

In the forming step, which may be also called a heading step, the predetermined length of carbon steel wire is formed so as to form an intermediate part, which is elongate and which has a head on one end and a shank between its ends. If the shank is tapered, it is generally tapered in the forming step. In the rolling step, the intermediate part is rolled so as to form a point conforming substantially to a tangent ogive, which is tangent to the shank, whereby a pin is formed. If the shank is knurled, it is knurled in the rolling step. In the heat treating step, the pin is hardened, preferably by austempering so as to provide the pin with a surface hardness of not greater than Rockwell C 52, preferably not greater than Rockwell C 48. The core hardness is preferably between Rockwell C 48 and Rockwell C 58. Optionally, the pin is decarburized in a conventional manner, after the rolling step, before the heat treating step.

BRIEF DESCRIPTION OF THE DRAWINGS

These and other objects, features, and advantages of this invention will be evident from the following description of a preferred mode for carrying out this invention, with reference to the accompanying drawings in which like reference characters designate like or corresponding parts throughout the several views, and wherein:

FIG. 1 is a fragmentary perspective view of a fastener comprising a steel pin and a steel washer and constituting a preferred embodiment of this invention, as used to fasten a steel decking member to a steel bar joist.

FIG. 2, on an enlarged scale, is an elevational view of the steel pin and a cross-sectional view of the steel washer, after the steel pin and the steel washer have been combined to provide the fastener and before the fastener has been driven.

FIG. 3, on a similar scale, is an elevational view of an intermediate part, after a predetermined length of carbon steel wire has been formed to form the intermediate part and before the intermediate part has been rolled to form the steel pin.

FIG. 4, on a similar scale, is a plan view of the steel washer, as seen from above.

FIG. 5, on a similar scale, is a sectional view of the steel washer, as taken along line 5—5 of FIG. 4, in a direction indicated by the arrows.

FIG. 6 is a further enlarged, fragmentary detail, as taken from FIG. 4.

FIGS. 7, 8, and 9 are schematic views of initial, intermediate, and final stages in a rolling process, as seen from below, in which the intermediate part is rolled between two rolling dies to form the steel pin.

FIGS. 10, 11, and 12 are schematic views of the same stages of the rolling process, as seen from one end of the rolling dies.

DETAILED DESCRIPTION OF THE PREFERRED MODE

As shown in FIG. 1, an improved fastener 10 comprising a steel pin 100 in an improved form to be later described and a steel washer 200 in an improved form to be later described and constituting a preferred embodiment of this invention is useful for fastening a steel decking member 12, which is made from thin sheet steel oftentimes of 18 to 22 gauge, to a steel bar joist 14 thickness of 0.125 inch to about 0.1875 inch and a minimum tensile strength of 36,000 psi. Here, the decking member 12 is regarded as a workpiece, and the bar joist 14 is regarded as a substrate. The fastener 10 is shown in FIG. 2, as assembled from the pin 100 and the washer 200, before the fastener 10 is driven.

In a preferred application of this invention, the fastener 10 can be forcibly driven by a fastener-driving tool, such as a powder-actuated tool, as exemplified by the powder-actuated, nosepiece-equipped, fastener-driving tool disclosed in Dewey et al. U.S. Pat. Nos. 5,193,729, 5,199,506, and 5,199,625, the disclosures of which are incorporated herein by reference. If such a tool is used, the fastener 10 is sized to be axially guided in its nosepiece, in a manner to be later described.

In an alternative application of this invention, the fastener 10 can be forcibly driven by a powder-actuated, fastener-driving tool, as exemplified by the powder-actuated, muzzle-equipped, fastener-driving tool disclosed in Almeras et al. U.S. Pat. No. 4,824,003, the disclosure of which is incorporated herein by reference. If such a tool is used, the fastener 10 is sized to enable the fastener 10 to be muzzle-loaded, in a manner disclosed therein.

Broadly, the steel pin 100 comprises a head 110, a shank 120, a point 130, and a transition zone 140 between the shank 120 and the head 110. The washer 200 is carried on the shank 120, in axially spaced relation to the head 110, and is movable toward the head 110 when the fastener 10 is forcibly driven through the decking member 12, into the bar joist 14, so that the washer 200 bears against the decking member 12.

The tapered shank 120 of the steel pin 100 defines a conical angle (total taper), preferably in a range from about 2° to about 4°, and has a knurled surface 122, a smaller end 124, and a larger end 126. The smaller end 124 has a diameter smaller than the initial diameter of the predetermined length of carbon steel wire, preferably being about 0.6 times the initial diameter thereof. The larger end 126 has a diameter about 0.7 times the initial diameter of the predetermined length of carbon steel wire.

Being joined unitarily to the smaller end 124 of the tapered shank 120, the point 130 has a tip 132 and conforms except at the tip 132, which is rounded, substantially to a tangent ogive, which is tangent to the tapered shank 120.

Being between the tapered shank 120 and the head 110, the transition zone 140 has a tapered portion 142 defining a comparatively larger conical angle, preferably a conical angle (total taper) of about 40°. The tapered portion 142 has a smaller end 144 joined unitarily to the larger end 126 of the tapered shank 120. The tapered portion 142 has a larger end 146 joined unitarily to the head 110, by means of a circumferential fillet 148, which is regarded as an integral part of the transition zone 140.

The larger end 146 of the tapered portion of the transition zone 140 has a diameter larger than the initial diameter of the predetermined length of carbon steel wire, preferably about 1.1 times the initial diameter thereof. The axial predetermined length of the transition zone 140, which includes the circumferential fillet 148, is less than about one half of the axial length of the tapered shank 120. It is convenient next to describe the material used to make the steel pin 100.

The steel pin 100 is made from a predetermined length of carbon steel wire, which has a carbon content in a range from about the carbon content of AISI C 1038 steel, which has a carbon content from 0.35 percent to 0.38 percent, to about the carbon content of AISI C 1065 steel, which has a carbon content from 0.60 percent to 0.70 percent. A high-manganese carbon steel having a carbon content in a similar range, such as AISI C 1562 high-manganese carbon steel, can be alternatively used. In a preferred mode for carrying out this invention, a predetermined length of AISI C 1062 steel wire is used, which has an initial diameter of about 0.208 inch.

In an alternative embodiment, such as a pin for fastening to thinner steel, a lower core hardness for the pin may be used, so that a lower carbon wire may be used to create the pin. Also, a more aggressive knurl may be preferred in this application, possibly a knurl with a slight helix.

In a preferred mode for carrying out this invention, the steel pin 100 has novel proportions, which may be conveniently referenced to the initial diameter of the predetermined length of carbon steel wire used to make the pin 100. The head 110 has an outer diameter at least about 2.6 times greater than the initial diameter of the predetermined length of carbon steel wire. The tapered shank 120 has a larger end 126, which has a diameter about 0.7 times the initial diameter of the predetermined length of carbon steel wire, and the larger end 146 of the tapered portion of the transition zone 140 has a diameter about 1.1 times the initial diameter of the predetermined length of carbon steel wire. It is noted that since the larger end 146 of the tapered portion of the transition zone 140 has a diameter which is preferably about 1.1 times the initial diameter of the predetermined length of carbon steel wire, and furthermore, since the head 110 has an outer diameter which is at least 2.6 times greater than the initial diameter of the predetermined length of carbon steel wire, then the outer diameter of the head 110 is approximately 2.36 times greater than the diameter of the larger end 146 of the tapered portion of the transition zone 140.

In an initial step, which is a forming step that may be also called a heading step and which is performed with conventional head-forming equipment for forming heads on pins or screws, the predetermined length of carbon steel wire is formed so as to form an intermediate part 150, which is elongate and has a headed end 152 and an opposite end 154. Suitable head-forming equipment is available commercially from National Machinery Company of Tiffin, Ohio, under Model 56.

As shown in FIG. 3, the intermediate part 150 has the head 110, which is formed on the headed end 152, the shank 120, which is tapered but not yet knurled, the transition zone 140, which is disposed between the head 110 and the shank 120, and the opposite end 154. In a further step to be next described, the point 130 is formed on the opposite end 154, and the tapered shank 120 may be knurled. It is preferred that the tapered shank 120 be knurled.

In the further step, which is a rolling step performed with conventional form-rolling equipment for rolling threads on screws, the intermediate part 150 is rolled between two rolling dies $D_1$, $D_2$, which employ the head 110 as a datum and which are configured suitably. Suitable form-rolling equipment is available commercially from E. W. Menn GmbH Maschinenfabrik of Hilgenbach, Germany, under Model GW 120-H.

As the rolling dies undergo relative movement from an initial stage shown schematically in FIGS. 7 and 10, through an intermediate stage shown schematically in FIGS. 8 and 11, to a final stage shown schematically in FIGS. 9 and 12, the intermediate part 150 is rolled so as to form the point 130 and so as to knurl the tapered shank 120, if the tapered shank 120 is to be knurled, whereby the pin 100 is formed. As formed in the rolling step, the point 130 has a tip 132 and conforms except at the tip 132, which is rounded, substantially to a tangent ogive, which is tangent to the tapered, knurled shank 120. A fragment 156 of the pointed end 154 is removed at the end of the die travel. It has been found that relatively long dies are preferable so that the movement of material in the pin is slow and the point of the pin is not overheated, and thus over work-hardened, whereby a uniform, smooth surface results, without laps or seams.

In a final step, which is an austempering step performed with conventional heat treating equipment, the pin 100 is austempered so as to have a surface hardness not greater than about Rockwell C 48, or not greater than about Rockwell C 52 if the tapered shank 120 is not knurled, and a core hardness in a range from about Rockwell C 48 to about Rockwell C 58. Suitable heat treating equipment is available commercially from numerous sources. Optionally, the pin 100 is decarburized in a conventional manner, after the rolling step, before the austempering step.

The steel washer 200 is stamped from a sheet of carbon steel, such as AISI C 1038 steel, which is preferred. Being annular, the washer 200 has an annular periphery 202 and a central aperture 210, which has a margin 212 with a novel configuration. The washer 200 is solid between the annular periphery 202 and the margin 212 of the central aperture 210. The margin 212 of the central aperture 210 defines four pin-engaging protrusions 214, which have concave pin-engaging surfaces 216, which are similar to one another, and which are spaced angularly and regularly from one another by four similar recesses 218. Before the washer 200 is fitted onto the pin 100, each pin-engaging surface 216 conforms essentially to a section of an imaginary cylinder of a given diameter. Each recess 218 conforms essentially to a section of an imaginary cylinder of a larger diameter.

Collectively, as contemplated by this invention, the pin-engaging surfaces 216 encompass a minor portion of a complete cylinder. As shown, in the preferred mode for carrying out this invention, each pin-engaging surface 216 encompasses about 30°, which is one twelfth of a complete cylinder. Collectively, in the preferred mode for carrying out this invention, the pin-engaging surfaces 216 encompass about one third of a complete cylinder.

In the improved fastener 10, the annular periphery 202 of the washer 200 has an outer diameter equal approximately to the outer diameter of the head 110 of the pin 100. Further, the central aperture 210 of the washer 200 enables the washer 200 to be tightly fitted over the tapered shank 120 of the pin 100, near the smaller end 124 of the tapered shank 120, when the fastener 10 is assembled. Thus, there is sufficient contact area between the washer 200 and the tapered shank 120 such that when the fastener 10 is driven by a powder-actuated tool or an equivalent tool and is accelerated, the washer 200 does not move significantly along the tapered shank 120 but stays near the point 130. Being spaced axially, the washer 200 and the head 100 of the pin guide the fastener 10 without permitting the fastener 10 to tumble in the nosepiece of a nosepiece-equipped, fastener-driving tool, as discussed above.

Also, when the fastener 10 is driven, the washer 200 is arranged to be forcibly moved along the tapered shank 120, toward the larger end 126 of the tapered shank 120, when the washer 200 engages a workpiece or a substrate. Because the pin-engaging surfaces 216 of the washer 200 encompass about one third of a complete cylinder, the pin-engaging surfaces 216 limit potential damage to the knurled surface 122 of the tapered shank 120 of the pin 100 when the washer 200 is moved along the tapered shank 120, toward the larger end 126 of the tapered shank 120.

Various modifications may be made in the preferred mode for carrying out this invention without departing from the scope and spirit of this invention.

What is claimed is:

1. A method of assembling roof decking to an underlying substrate by using a fastener-driving tool for driving fastener pin-washer assemblies into said underlying substrate, comprising the steps of:

providing a pin having a head having a predetermined outer diameter; a tapered shank defining a predetermined conical angle and having a smaller end and a larger end; a point joined unitarily to said smaller end of said tapered shank and conforming substantially to an ogive; and a transition zone having a small end joined unitarily to said larger end of said tapered shank and a large end joined unitarily to said head;

mounting a washer upon said tapered shank of said pin at an axial position spaced from said head of said pin, wherein said washer has a predetermined outer diameter which is substantially the same as said predetermined outer diameter of said head of said pin so as to cooperate with said head of said pin in axially guiding said pin as said pin is axially driven through a fastener-driving tool, wherein said washer remains intact so as to engage said roof decking after said pin is driven into said substrate by the fastener-driving tool so as to secure said roof decking to said substrate and maintain said roof decking secured to said substrate, and wherein further, said washer comprises an annular periphery and a central aperture, said central aperture having a margin defined by a plurality of concave, pin-engaging surfaces spaced angularly from one another, wherein each pin-engaging surface conforms essentially to a cylindrical section, and wherein further said pin-engaging surfaces collectively encompass less than one-half of a complete cylinder, but not less than about one third of a complete cylinder, so as to limit potential damage to said tapered shank of said pin when said washer is moved axially along said tapered shank of said pin as said pin is driven into said substrate by the fastener-driving tool; and driving said pin through said roof decking and into said substrate whereupon said washer is moved relatively with respect to, and along, said tapered shank of said pin from said axial position spaced from said head of said pin to an axial position nearer to said head of said pin so as to engage said roof decking and secure said roof decking to said substrate.

2. The method as set forth in claim 1, further comprising:
said roof decking comprises an angle joist having horizontally and vertically disposed webs; and
driving said pin of said fastener pin-washer assembly into said horizontally disposed web of said roof decking.

3. The method as set forth in claim 1, further comprising:
fabricating said pin from a predetermined length of carbon steel wire having a carbon content which is within the range of from about the carbon content of AISI C 1038 steel to about the carbon content of AISI C 1062 steel.

4. The method as set forth in claim 1, further comprising:
forming said pin such that said outer diameter of said head of said pin is approximately 2.36 times greater than said large end of said transition zone of said pin.

5. The method as set forth in claim 1, wherein:
said tapered shank is rolled so as to form said point upon said smaller end of said tapered shank, and said point conforms substantially to a tangent ogive which is tangent to said tapered shank.

6. The method as set forth in claim 1, further comprising the step of:
heat treating said pin so as to harden said pin.

7. The method as set forth in claim 6, wherein said heat treating of said pin comprises the step of:
austempering said pin so as to provide said pin with a surface hardness which is not greater than approximately Rockwell C 48.

8. The method as set forth in claim 6, wherein said heat treating of said pin comprises the step of:
austempering said pin so as to provide said pin with a core hardness which is within the range of from approximately Rockwell C 48 to approximately Rockwell C 58.

9. The method as set forth in claim 3, wherein:
said predetermined length of carbon steel wire has an initial predetermined diameter; and
said head of said pin has an outer diameter which is at least approximately 2.6 times greater than said initial predetermined diameter of said predetermined length of carbon steel wire.

10. The method as set forth in claim 3, wherein:
said predetermined length of carbon steel wire has an initial predetermined diameter; and
said smaller end of said tapered shank has an outer diameter which is approximately 0.6 times said initial predetermined diameter of said predetermined length of carbon steel wire.

11. The method as set forth in claim 3, wherein:
said predetermined length of carbon steel wire has an initial predetermined diameter; and
said large end of said transition zone has an outer diameter which is greater than said initial predetermined diameter of said predetermined length of carbon steel wire.

12. The method as set forth in claim 3, wherein:
said predetermined length of carbon steel wire has an initial predetermined diameter;
said larger end of said tapered shank has an outer diameter which is approximately 0.7 times said initial predetermined diameter of said predetermined length of said carbon steel wire; and
said large end of said transition zone has an outer diameter which is approximately 1.1 times said initial predetermined diameter of said predetermined length of carbon steel wire.

13. The method as set forth in claim 3, wherein:
said predetermined length of carbon steel wire is knurled between said larger and smaller ends of said tapered shank.

14. The method as set forth in claim 3, wherein:
said pin is formed from a predetermined length of high-manganese carbon steel wire.

* * * * *